US010526558B2

(12) United States Patent
Ahlers et al.

(10) Patent No.: US 10,526,558 B2
(45) Date of Patent: Jan. 7, 2020

(54) FUEL OIL COMPOSITIONS WITH IMPROVED COLD FLOW PROPERTIES

(71) Applicant: BASF SE, Ludwigshafen (DE)

(72) Inventors: Wolfgang Ahlers, Worms (DE); Andreas Fechtenkoetter, Ludwigshafen (DE); Frank-Olaf Maehling, Mannheim (DE); Irene Troetsch-Schaller, Bissersheim (DE); Ansgar Eisenbeis, Weisenheimam Berg (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 16/046,034

(22) Filed: Jul. 26, 2018

(65) Prior Publication Data

US 2018/0334631 A1   Nov. 22, 2018

Related U.S. Application Data

(60) Division of application No. 15/425,427, filed on Feb. 6, 2017, now Pat. No. 10,047,314, which is a continuation of application No. 14/136,401, filed on Dec. 20, 2013, now Pat. No. 9,605,227, which is a continuation of application No. 13/011,614, filed on Jan. 21, 2011, now Pat. No. 8,642,521, which is a continuation of application No. 12/493,104, filed on Jun. 26, 2009, now abandoned, which is a continuation of application No. 10/581,042, filed as application No. PCT/EP2004/013781 on Dec. 3, 2004, now abandoned.

(30) Foreign Application Priority Data

Dec. 4, 2003   (DE) .................................. 103 56 595

(51) Int. Cl.

| *C10L 10/16* | (2006.01) |
| *C08F 210/02* | (2006.01) |
| *C10L 1/19* | (2006.01) |
| *C10L 10/14* | (2006.01) |
| *C10M 145/14* | (2006.01) |
| *C10L 1/197* | (2006.01) |

(52) U.S. Cl.
CPC ............ *C10L 10/16* (2013.01); *C08F 210/02* (2013.01); *C10L 1/1973* (2013.01); *C10L 10/14* (2013.01); *C10M 145/14* (2013.01); *C08F 2500/03* (2013.01); *C08F 2800/10* (2013.01); *C10L 2250/04* (2013.01); *C10L 2270/026* (2013.01); *C10M 2209/084* (2013.01); *C10N 2230/08* (2013.01)

(58) Field of Classification Search
CPC ........ C10L 10/16; C10L 10/14; C10L 1/1973; C10L 3350/04; C10L 2270/026; C08F 210/02; C08F 2800/10; C08F 2500/03; C10M 145/14; C10M 2209/084; C10N 2230/08
USPC ......................................................... 526/329
See application file for complete search history.

(56) References Cited

U.S. PATENT DOCUMENTS

| 3,038,479 | A | | 6/1962 | Colt |
| 3,304,261 | A | | 2/1967 | Ilnyckyj et al. |
| 3,467,597 | A | | 9/1969 | Tunkel et al. |
| 3,627,838 | A | | 12/1971 | Ilnyckyj et al. |
| 3,642,459 | A | | 2/1972 | Ilynyckyj |
| 3,961,961 | A | | 6/1976 | Rich |
| 4,087,255 | A | | 5/1978 | Wisotsky et al. |
| 4,155,719 | A | | 5/1979 | Sweeney |
| 4,156,434 | A | | 5/1979 | Parker et al. |
| 4,211,534 | A | * | 7/1980 | Feldman ................. C10L 1/146 44/394 |
| 4,404,000 | A | | 9/1983 | Toyoshima et al. |
| 4,491,455 | A | | 1/1985 | Ishizaki et al. |
| 4,900,332 | A | | 2/1990 | Denis et al. |
| 4,906,682 | A | * | 3/1990 | Mueller .................. C08L 23/08 524/505 |
| 5,866,276 | A | | 2/1999 | Ogami et al. |
| 5,882,364 | A | | 3/1999 | Dilworth |
| 6,071,993 | A | | 6/2000 | Wenderoth et al. |
| 6,254,650 | B1 | * | 7/2001 | Dounis ................ C10M 133/16 44/393 |
| 6,384,170 | B1 | | 5/2002 | Krull et al. |
| 6,509,424 | B1 | | 1/2003 | Krull et al. |
| 6,592,638 | B2 | * | 7/2003 | Krull ...................... C10L 1/143 44/383 |

(Continued)

FOREIGN PATENT DOCUMENTS

CN    1362498    8/2002
DE    19 02 925   11/1969

(Continued)

OTHER PUBLICATIONS

International Search Report dated Jul. 4, 2005 in PCT/EP2004/013781, filed on Dec. 3, 2004.
Korean Office Action issued by Korean Industrial Property Office dated Aug. 18, 2011, corresponding to KR10-2010-0054500 and Request for Entry.
Korean office Action dated Apr. 2, 2012 in connection with Korean Patent Application Serial No. 10-2010-0054500 and Request for Entry of the Accompanying Office Action.

*Primary Examiner* — Michael Bernshteyn
(74) *Attorney, Agent, or Firm* — Oblon, McClelland, Maier & Neustadt, L.L.P.

(57) ABSTRACT

The use is described of polymers which contain, in copolymerized form, an α-olefin, a vinyl ester and an ester of an α,β-unsaturated carboxylic acid as an additive for fuel oils and lubricants and in particular as a cold flow improver in fuel oils. In addition, the fuel oils and lubricants additized with these polymers; and also additive packages comprising such polymers are described.

8 Claims, No Drawings

(56) References Cited

U.S. PATENT DOCUMENTS

| | | |
|---|---|---|
| 6,786,940 B1 | 9/2004 | Wenderoth et al. |
| 7,642,004 B2 | 1/2010 | Shimoyama |
| 2001/0034308 A1 | 10/2001 | Krull et al. |
| 2001/0046624 A1 | 11/2001 | Goto et al. |
| 2002/0028890 A1 | 3/2002 | Krull et al. |
| 2005/0064280 A1 | 3/2005 | Watanabe et al. |
| 2007/0148536 A1 | 6/2007 | Kang et al. |
| 2007/0264562 A1 | 11/2007 | Kang et al. |
| 2009/0061301 A1 | 3/2009 | Planck |
| 2009/0191452 A1 | 7/2009 | Anantharaman et al. |
| 2010/0209759 A1 | 8/2010 | Rejman et al. |
| 2011/0135993 A1 | 6/2011 | An et al. |

FOREIGN PATENT DOCUMENTS

| | | |
|---|---|---|
| DE | 2102469 | 8/1972 |
| DE | 25 15 805 | 10/1975 |
| DE | 31 41 507 | 4/1983 |
| DE | 3613247 | 10/1987 |
| DE | 254956 | 3/1988 |
| DE | 196 22 052 | 12/1997 |
| DE | 198 48 621 | 4/2000 |
| EP | 0007590 | 2/1980 |
| EP | 0061895 | 10/1982 |
| EP | 0217602 | 4/1987 |
| EP | 0261957 | 3/1988 |
| EP | 0291367 | 11/1988 |
| EP | 0398101 | 11/1990 |
| EP | 0721492 | 7/1996 |
| EP | 0739971 | 10/1996 |
| EP | 0813550 | 12/1997 |
| EP | 0922716 | 6/1999 |
| EP | 0926168 | 6/1999 |
| EP | 1134273 | 9/2001 |
| EP | 1391498 | 2/2004 |
| FR | 2005236 | 3/1969 |
| GB | 1244512 | 1/1969 |
| GB | 1368159 | 9/1974 |
| GB | 1499568 | 2/1978 |
| JP | 56-61488 | 5/1981 |
| JP | 58-23885 | 2/1983 |
| JP | 59-108093 | 6/1984 |
| JP | 9-86188 | 3/1997 |
| JP | 2001325996 | 11/2001 |
| JP | 2008047301 | 2/2008 |
| JP | 2008047488 | 2/2008 |
| JP | 2009123398 | 6/2009 |
| KR | 1020070075711 | 7/2007 |
| KR | 20070117334 | 12/2007 |
| WO | 94/00537 | 1/1994 |
| WO | WO 96/07718 | 3/1996 |
| WO | 96/17905 | 6/1996 |
| WO | 96/34073 | 10/1996 |
| WO | 00 44857 | 8/2000 |
| WO | 02/090470 | 11/2002 |

\* cited by examiner

FUEL OIL COMPOSITIONS WITH IMPROVED COLD FLOW PROPERTIES

CROSS-REFERENCE TO RELATED APPLICATIONS

This application is a Divisional of U.S. application Ser. No. 15/425,427, filed on Feb. 6, 2017, which is a continuation of U.S. application Ser. No. 14/136,401, filed on Dec. 20, 2013, which is a continuation of U.S. application Ser. No. 13/011,614, filed on Jan. 21, 2011, which is a continuation of U.S. application Ser. No. 12/493,104, filed Jun. 26, 2009, which is a continuation of U.S. application Ser. No. 10/581,042, filed Dec. 19, 2006, which is a national stage filing of PCT/EP04/13781 filed Dec. 3, 2004 and claims priority to Germany 103 56 595.7 filed Dec. 4, 2003.

BACKGROUND OF THE INVENTION

Field of the Invention

The invention relates to the use of polymers which contain, in copolymerized form, an α-olefin, a vinyl ester and an ester of an α,β-unsaturated carboxylic acid as an additive for fuel oils and lubricants and in particular as a cold flow improver in fuels; to the fuel oils and lubricants additized with these polymers; and to additive packages comprising such polymers.

Description of the Related Art

On temperature reduction, mineral oils comprising paraffinic waxes, such as middle distillates, diesel and heating oils, exhibit a distinct deterioration in the flow properties. The cause of this is the crystallization occurring from the cloud point temperature of relatively long-chain paraffins which form large, platelet-shaped wax crystals. These wax crystals have a spongelike structure and lead to inclusion of other fuel constituents in the crystal structure. The occurrence of these crystals leads rapidly to clogging of fuel filters both in tanks and in motor vehicles. At temperatures below the pour point (PP) the fuel eventually does not flow at all.

To alleviate these problems, fuel additives, which frequently consist of combinations of nucleators for early formation of very small crystals of the paraffins with the actual cold flow improvers (also known as CFI or MDFI), have already been added in small concentrations for some time. These in turn exhibit similar crystallization properties to the paraffins of the fuel, but prevent their growth, so that it is possible for it to pass through the filter at distinctly lower temperatures compared to the unadditized fuel. The cold filter plugging point (CFPP) is determined as a measure thereof. Further additives which can be used are wax antisettling additives (WASA), which prevent the settling of the very small crystals in the fuel.

Depending on the composition of the base fuel and of the additive, cold flow improvers are added in amounts of from about 50 to 500 ppm. The prior art discloses various CFI products (cf, for example, U.S. Pat. Nos. 3,038,479, 3,627, 838 and 3,961,961, EP-A-0,261,957 or DE-A-31 41 507 and 25 15 805). Common CFIs are usually polymeric compounds, in particular ethylene-vinyl acetate (EVA) copolymers, for example the products sold by BASF AG under the tradename Keroflux.

Combinations of conventional CFIs with lubricity improvers (esters of mono- or polycarboxylic acids with mono- or polyalcohols) are also described as improved CFI combinations (EP-A-0 721 492).

EP 0922716 describes a process for preparing terpolymers which, in addition to ethylene, contain, in copolymerized form, at least two further ethylenically unsaturated compounds such as vinyl esters, acrylic or methacrylic esters, alkyl vinyl ethers or higher olefins. These are said to be suitable as flow point improvers of mineral oil distillates.

DE 1902925 describes terpolymers which contain, in copolymerized form, ethylene, vinyl esters of short-chain carboxylic acids, such as vinyl acetate, and long-chain unsaturated monoesters, such as vinyl esters of long-chain carboxylic acids, or acrylic esters which derive from long-chain alcohols. These are said to lower the pour point of middle distillates and improve their filterability.

U.S. Pat. No. 4,156,434 describes terpolymers which, in addition to ethylene and vinyl acetate, contain, in copolymerized form, an acrylic ester which derives from $C_{12}$-$C_{24}$-alcohols. These are said to lower the pour point of gas oils. No filterability-improving action is described.

There is a continuing need for further additives having CFI properties, especially those which are less expensive to use, for example because they improve the cold flow properties of fuel oils or lubricants and especially the filterability of fuel oils in lower dosage than commercial CFIs.

BRIEF SUMMARY OF THE INVENTION

It is accordingly an object of the present invention to provide novel such additives.

Surprisingly, this object is achieved by the unexpected observation that polymers which contain, in copolymerized form, an α-olefin, a vinyl ester and an ester of an α,β-unsaturated carboxylic acid can be used as CFI additives and also have better performance than conventional EVA-CFIs.

The invention accordingly relates firstly to the use of a polymer which contains, in copolymerized form, an α-olefin, a vinyl ester and an ester of an α,β-unsaturated carboxylic acid as an additive for fuel oils and lubricants. In particular, the polymers used are those which contain the vinyl ester and the ester of the α,β-unsaturated carboxylic acid copolymerized in random distribution. The polymer is preferably a terpolymer which is composed substantially of the three aforementioned monomers.

Preference is given to using polymers which are composed of monomers including the monomers M1, M2 and M3, where M1, M2 and M3 have the following general formulae:

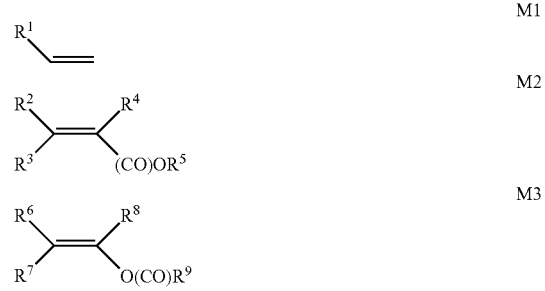

where
$R^1$ is H or $C_1$-$C_{40}$-hydrocarbyl, for example $C_1$-$C_{20}$-, in particular $C_1$-$C_{10}$-, preferably $C_1$-$C_4$-hydrocarbyl;
$R^2$, $R^3$ and $R^4$ are each independently H or $C_1$-$C_4$-alkyl;

$R^5$ is $C_1$-$C_{20}$-hydrocarbyl;
$R^6$, $R^7$ and $R^8$ are each independently H or $C_1$-$C_4$-alkyl; and
$R^9$ is $C_1$-$C_{20}$-hydrocarbyl.

The monomers M1, M2 and M3 may be present in the polymers used in accordance with the invention in the following molar proportions (Mx/(M1+M2+M3) in the polymer:

M1: from 0.60 to 0.98, preferably from 0.7 to 0.95, in particular from 0.8 to 0.9;
M2: from 0.01 to 0.20, preferably from 0.015 to 0.17, in particular from 0.02 to 0.16;
M3: from 0.01 to 0.20, preferably from 0.02 to 0.15, in particular from 0.03 to 0.1, especially from 0.03 to 0.09.

$R^1$ is preferably H, methyl or ethyl and in particular H; in other words, the monomer M1 is preferably ethylene, propene or 1-butene and in particular ethylene.

In the monomer M2, the $R^2$, $R^3$ and $R^4$ radicals are preferably each H or methyl. More preferably, two of the $R^2$, $R^3$ and $R^4$ radicals are each H and the other radical is H or methyl. In particular, all three $R^2$, $R^3$ and $R^4$ radicals are H.

$R^5$ is preferably $C_1$-$C_{12}$-hydrocarbyl, particularly preferably $C_1$-$C_{10}$-hydrocarbyl, more preferably $C_1$-$C_9$-hydrocarbyl and even more preferably $C_4$-$C_8$-hydrocarbyl. Hydrocarbyl is preferably alkyl. In particular, $R^5$ is n-butyl, 2-ethylhexyl or lauryl, of which even greater preference is given to n-butyl and 2-ethylhexyl and especially 2-ethylhexyl.

The monomer M2 is preferably selected from n-butyl acrylate, 2-ethylhexyl acrylate and lauryl acrylate and more preferably from n-butyl acrylate and 2-ethylhexyl acrylate. In particular, it is 2-ethylhexyl acrylate.

In the monomer M3, $R^6$, $R^7$ and $R^8$ are each independently preferably H or methyl and more preferably H.

$R^9$ is preferably $C_1$-$C_{10}$-hydrocarbyl. Hydrocarbyl is preferably alkyl. $R^9$ is more preferably ethyl or methyl and in particular methyl.

The monomer M3 is more preferably vinyl acetate.

The polymers used in accordance with the invention are preferably obtainable by, preferably free-radical, polymerization, especially high-pressure polymerization, of the monomers M1, M2 and M3.

Polymers used with preference are selected from ethylene/n-butyl acrylate/vinyl acetate polymers, ethylene/2-ethylhexyl acrylate/vinyl acetate polymers and ethylene/lauryl acrylate/vinyl acetate polymers, and particular preference is given to the two first-mentioned polymers. In particular, ethylene/2-ethylhexyl acrylate/vinyl acetate polymers are used.

Preference is given to using the polymers as cold flow improvers.

The above-described polymers are used alone or in combination with other such polymers in amounts which are sufficient to exhibit action as a cold flow improver in the additized fuel or lubricant.

The invention further provides fuel oil compositions comprising a major proportion by weight of a middle distillate fuel boiling in the range of about 120-500° C. and a minor proportion by weight of at least one polymer used in accordance with the invention (cold flow improver) as defined above.

Such fuel oil compositions may also include, as a fuel component, biodiesel (from animal and/or vegetable production) in proportions of 0-100% by weight, preferably of from 0 to 30% by weight.

Preferred fuel oil compositions are selected from diesel fuels, kerosene and heating oil, and the diesel fuel may be obtainable by refining, coal gasification or gas liquefaction, or may be a mixture of such products and may optionally be mixed with renewable fuels. Preference is given to those fuel oil compositions in which the sulfur content of the mixture is preferably at most 500 ppm.

The invention further provides lubricant compositions comprising a major proportion by weight of a conventional lubricant and a minor proportion by weight of at least one polymer as defined above.

In the context of the present invention, the polymers used in accordance with the invention may be used in combination with further conventional cold flow improvers and/or further lubricants and fuel oil additives.

The invention finally also relates to additive packages comprising at least one polymer used in accordance with the invention as defined above in combination with at least one further conventional lubricant and fuel oil additive.

DETAILED DESCRIPTION OF THE INVENTION a) Polymers Used in Accordance with the Invention The polymers used in accordance with the invention are preferably composed substantially of the above-defined monomers M1, M2 and M3. As a result of the preparation, small traces of a compound used as a regulator (chain terminator) may in some cases be present.

When no other information is given, the following general definitions apply:

$C_1$-$C_{40}$-Hydrocarbyl is in particular $C_1$-$C_{40}$-alkyl such as methyl, ethyl, n-propyl, isopropyl, n-butyl, sec-butyl, isobutyl, tert-butyl, pentyl, hexyl, heptyl, octyl, 2-ethylhexyl, nonyl, decyl, undecyl, dodecyl, tridecyl, tetradecyl, pentadecyl, hexadecyl, heptadecyl, octadecyl, nonadecyl, eicosyl, hencosyl, docosyl, tricosyl, tetracosyl, pentacosyl, hexacosyl, heptacosyl, octacosyl, nonacosyl, squalyl and the higher homologs and the corresponding positional isomers. The same applies to $C_1$-$C_{20}$-hydrocarbyl radicals. $C_1$-$C_9$-Hydrocarbyl is in particular $C_1$-$C_9$-alkyl such as methyl, ethyl, n-propyl, isopropyl, n-butyl, sec-butyl, isobutyl, tert-butyl, pentyl, neopentyl, hexyl, heptyl, octyl, neooctyl, 2-ethylhexyl, nonyl and neononyl. $C_1$-$C_{10}$-Hydrocarbyl is additionally in particular also decyl and neodecyl. $C_4$-$C_8$-Hydrocarbyl is in particular $C_4$-$C_8$-alkyl such as n-butyl, sec-butyl, isobutyl, tert-butyl, pentyl, hexyl, heptyl, octyl and 2-ethylhexyl.

Examples of suitable monomers M1 include: monoalkenes having nonterminal or preferably terminal double bond, in particular ethylene, propylene, 1-butene, 1-pentene, 1-hexene, 1-heptene, 1-octene, 1-nonene and 1-decene, and also the higher monounsaturated homologs having up to 40 carbon atoms.

Examples of preferred α,β-unsaturated carboxylic esters M2 include: acrylic esters of $C_1$-$C_{20}$-alkanols, such as methyl acrylate, ethyl acrylate, propyl acrylate, isopropyl acrylate, n-butyl acrylate, isobutyl acrylate, tert-butyl acrylate, n-pentyl acrylate, neopentyl acrylate, hexyl acrylate, heptyl acrylate, octyl acrylate, neooctyl acrylate, 2-ethylhexyl acrylate, nonyl acrylate, neononyl acrylate, decyl acrylate, neodecyl acrylate, lauryl acrylate, palmityl acrylate and stearyl acrylate; also the corresponding methacrylic, crotonic and isocrotonic esters, of which the acrylates (acrylic esters) are preferred.

Examples of suitable monomers M3 include:
vinyl $C_1$-$C_{20}$-carboxylates, especially the vinyl esters of acetic acid, propionic acid, butyric acid, valeric acid, isovaleric acid, pivalic acid, caproic acid, enanthic acid, caprylic acid, pelargonic acid, neononanoic acid, neodecanoic acid, capric acid, lauric acid, myristic acid, palmitic acid, stearic acid and arachic acid; also the corresponding propenyl esters. However, preference is given to the vinyl esters.

The inventive polymers also have a number-average molecular weight $M_n$ in the range from about 1000 to 20 000, more preferably from 1000 to 10 000, in particular from 1500 to 6000 and especially from 1500 to 5000.

The polymers may also have a weight-average molecular weight $M_w$ of from 1000 to 30 000, in particular from 2000 to 20 000, and/or an $M_w/M_n$ ratio of from 1.5 to 5.0, preferably from 1.8 to 4.0 and in particular from 1.9 to 3.5.

Particularly preferred polymers are composed of the monomers ethylene, vinyl acetate and an acrylic ester monomer which is selected from n-butyl acrylate, 2-ethylhexyl acrylate and lauryl acrylate and preferably from n-butyl acrylate and 2-ethylhexyl acrylate. In particular, the acrylic ester monomer is 2-ethylhexyl acrylate.

Based on a polymer composed of ethylene, 2-ethylhexyl acrylate (EHA) and vinyl acetate (VAC), the proportion by weight of the monomers is:

EHA: 4-80% by weight, preferably from 5 to 62% by weight, in particular from about 7 to 45% by weight VAC: 1-42% by weight, preferably from 1 to 30% by weight, in particular from about 1 to 25% by weight, especially from 1 to 20% by weight The viscosity of such polymers (determined to Ubbelohde DIN 51562) is from about 5 to 25 000 mm²/s, preferably from about 10 to 1000 mm²/s, in particular from about 50 to 700 mm²/s, in each case at a temperature of about 120° C.

b) Preparation of the Polymers

The inventive polymers are prepared by processes known per se, preferably by the processes known from the prior art (cf., for example, *Ullmann's Encyclopedia of Industrial Chemistry*, 5th Edition, "Waxes", Vol. A 28, p. 146 ff., VCH, Weinheim, Basle, Cambridge, New York, Tokyo, 1996; also U.S. Pat. No. 3,627,838; DE-A 2515805; DE-A 3141507; EP-A 0007590) for direct, free-radical, high-pressure copolymerization of unsaturated compounds.

The copolymers are preferably prepared in stirred high-pressure autoclaves or in high-pressure stirred reactors or combinations of the two. In this apparatus, the length/diameter ratio remains predominantly within ranges of from 5:1 to 30:1, preferably 10:1 to 20:1.

Suitable pressure conditions for the polymerization are from 1000 to 3000 bar, preferably from 1500 to 2000 bar. The reaction temperatures are, for example, in the range from 160 to 320° C., preferably in the range from 200 to 280° C.

The regulator used for controlling the molecular weight of the copolymers is, for example, an aliphatic aldehyde or an aliphatic ketone of the general formula I

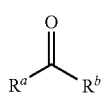

(I)

or mixtures thereof.

In the formula, the $R^a$ and $R^b$ radicals are the same or different and are selected from hydrogen;

$C_1$-$C_6$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl; more preferably $C_1$-$C_4$-alkyl, such as methyl, ethyl, n-propyl, isopropyl, n-butyl, isobutyl, sec-butyl and tert-butyl;

$C_3$-$C_{12}$-cycloalkyl, such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl.

The $R^a$ and $R^b$ radicals may also be covalently bonded to one another to form a 4- to 13-membered ring. For example, $R^a$ and $R^b$ together may form the following alkylene groups: —(CH$_2$)$_4$—, —(CH$_2$)$_5$—, —(CH$_2$)$_6$—, —(CH$_2$)$_7$—, —CH(CH$_3$)—CH$_2$—CH$_2$—CH(CH$_3$)— or —CH(CH$_3$)—CH$_2$—CH$_2$—CH$_2$—CH(CH$_3$)—.

Very particular preference is given to the use of propionaldehyde or ethyl methyl ketone as a regulator.

Further very suitable regulators are unbranched aliphatic hydrocarbons, for example propane, or branched aliphatic hydrocarbons having tertiary hydrogen atoms, for example isobutane, isopentane, isooctane or isododecane (2,2,4,6,6-pentamethylheptane). Further additional regulators which can be used are higher olefins, for example propylene.

Preference is likewise given to mixtures of the above regulators with hydrogen or hydrogen alone.

The amount of regulator used corresponds to the amounts customary for the high-pressure polymerization process.

Useful initiators for the free-radical polymerization are the customary free-radical initiators, for example organic peroxides, oxygen or azo compounds. Also suitable are mixtures of a plurality of free-radical initiators. Useful free-radical initiators include, for example, one or more peroxides selected from the following commercially obtainable substances:

didecanoyl peroxide, 2,5-dimethyl-2,5-di(2-ethylhexanoylperoxy)hexane, tert-amyl peroxy-2-ethylhexanoate, dibenzoyl peroxide, tert-butyl peroxy-2-ethylhexanoate, tert-butyl peroxydiethyl acetate, tert-butyl peroxydiethyl isobutyrate, 1,4-di(tert-butylperoxycarbo)cyclohexane as an isomer mixture, tert-butyl perisononanoate, 1,1-di(tert-butylperoxy)-3,3,5-trimethylcyclo-hexane, 1,1-di(tert-butylperoxy)cyclohexane, methyl isobutyl ketone peroxide, tert-butyl peroxyisopropyl carbonate, 2,2-di-tert-butylperoxy)butane or tert-butyl peroxyacetate;

tert-butyl peroxybenzoate, di-tert-amyl peroxide, dicumyl peroxide, the isomeric di(tert-butylperoxyisopropyl)benzenes, 2,5-dimethyl-2,5-di-tert-butylperoxyhexane, tert-butyl cumyl peroxide, 2,5-dimethyl-2,5-di(tert-butylperoxy)hex-3-yne, di-tert-butyl peroxide, 1,3-diisopropyl monohydroperoxide, cumene hydroperoxide or tert-butyl hydroperoxide; or dimeric or trimeric ketone peroxides, as disclosed, for example, by EP-A-0 813 550.

Particularly suitable peroxides are di-tert-butyl peroxide, tert-butyl peroxypivalate, tert-butyl peroxyisononanoate or dibenzoyl peroxide or mixtures thereof. An example of an azo compound is azobisisobutyronitrile (AIBN). The free-radical initiators are used in amounts customary for polymerizations.

In a preferred method, the inventive polymers are prepared in such a way that a mixture of the monomers M1, M2 and M3 is passed in the presence of the regulator at a temperature within the range from about 20 to 50° C., for example of 30° C., preferably continuously, through a stirred autoclave which is maintained at a pressure in the range from about 1500 to 2000 bar, for example of about 1700 bar. The preferably continuous addition of initiator which is generally dissolved in a suitable solvent, for example isododecane, keeps the temperature in the reactor at the desired reaction temperature, for example at from 200 to 250° C. The polymer obtained after the decompression of the reaction mixture is then isolated in a customary manner.

Modifications to this method are of course possible and can be undertaken by those skilled in the art without unreasonable effort. For example, the comonomers and the regulator can be separately metered into the reaction mixture, or the reaction temperature can be varied during the process, to name only a few examples.

c) Fuel Oil Compositions

According to the invention, fuel oil compositions are preferably fuels. Suitable fuels are gasoline fuels and middle distillates, such as diesel fuels, heating oil or kerosene, and particular preference is given to diesel fuel and heating oil.

The heating oils are, for example, low-sulfur or high-sulfur crude oil raffinates or bituminous or brown coal distillates which typically have a boiling range of from 150 to 400° C. The heating oils are preferably low-sulfur heating oils, for example those having a sulfur content of at most 0.1% by weight, preferably of at most 0.05% by weight, more preferably of at most 0.005% by weight and in particular of at most 0.001% by weight. Examples of heating oil are in particular heating oil for domestic oil-fired central heating or EL heating oil. The quality requirements for such heating oils are laid down, for example, in DIN 51-603-1 (see also Ullmann's Encyclopedia of Industrial Chemistry, 5th Edition, Vol. A12, p. 617 ff., which is explicitly incorporated herein by way of reference).

The diesel fuels are, for example, crude oil raffinates which typically have a boiling range of from 100 to 400° C. These are usually distillates having a 95% point of up to 360° C. or even higher. However, they may also be "ultra low sulfur diesel" or "City diesel", characterized by a maximum 95% point of, for example, 345° C. and a maximum sulfur content of 0.005% by weight, or by a 95% point of, for example, 285° C. and a maximum sulfur content of 0.001% by weight. Also suitable in addition to the diesel fuels obtainable by refining are those obtainable by coal gasification or gas liquefaction (gas-to-liquid (GTL) fuels). Also suitable are renewable fuels, such as biodiesel or bioethanol, mixtures thereof or mixtures of the renewable fuels with the aforementioned diesel fuels.

Particular preference is given to using the inventive additive for additizing diesel fuels having a low sulfur content, i.e. having a sulfur content of less than 0.05% by weight, preferably of less than 0.02% by weight, in particular of less than 0.005% by weight and especially of less than 0.001% by weight, of sulfur, or for additizing heating oil having a low sulfur content, for example having a sulfur content of at most 0.1% by weight, preferably of at most 0.05% by weight, for example at most 0.005% by weight or, for example, at most 0.001% by weight.

Preference is given to using the additive according to the invention in a proportion, based on the total amount of the fuel oil composition, which in itself has an essentially adequate influence on the cold flow properties of the fuel oil compositions. Particular preference is given to using the additive in an amount of from 0.001 to 1% by weight, more preferably from 0.01 to 0.15% by weight, in particular from 0.01 to 0.1% by weight, based on the total amount of the fuel oil composition.

d) Coadditives

The inventive polymers can be added to the fuel oil compositions individually or as a mixture of such polymers and optionally in combination with other additives known per se.

Suitable additives which can be present in fuel oils according to the invention in addition to the inventive polymer, especially for diesel fuels and heating oils, include detergents, corrosion inhibitors, dehazers, demulsifiers, antifoams, antioxidants, metal deactivators, multifunctional stabilizers, cetane number improvers, combustion improvers, dyes, markers, solubilizers, antistats, lubricity improvers, and also further additives which improve the cold flow properties of the fuel, such as nucleators, further conventional flow improvers (MDFIs), paraffin dispersants (WASAs) and the combination of the last two additives mentioned (WAFIs) (see also Ullmann's Encyclopedia of Industrial Chemistry, 5th Edition, Vol. A16, p. 719 ff; or the patents on cold flow improvers cited at the outset).

Further conventional cold flow improvers are in particular:

(a) copolymers of ethylene with at least one further ethylenically unsaturated monomer which are different from the polymers used in accordance with the invention;
(b) comb polymers;
(c) polyoxyalkylenes;
(d) polar nitrogen compounds;
(e) sulfo carboxylic acids or sulfonic acids or their derivatives; and
(f) poly(meth)acrylic esters.

In the copolymers of ethylene with at least one further ethylenically unsaturated monomer (a), the monomer is preferably selected from alkenylcarboxylic esters, (meth)acrylic esters and olefins.

Suitable olefins are, for example, those having from 3 to 10 carbon atoms and having from 1 to 3, preferably having 1 or 2, in particular having one, carbon-carbon double bond. In the latter case, the carbon-carbon double bond may either be terminal (α-olefins) or internal. However, preference is given to α-olefins, particular preference to α-olefins having from 3 to 6 carbon atoms, such as propene, 1-butene, 1-pentene and 1-hexene.

Suitable (meth)acrylic esters are, for example, esters of (meth)acrylic acid with $C_1$-$C_{10}$-alkanols, in particular with methanol, ethanol, propanol, isopropanol, n-butanol, sec-butanol, isobutanol, tert-butanol, pentanol, hexanol, heptanol, octanol, 2-ethyihexanol, nonanol and decanol.

Suitable alkenylcarboxylic esters are, for example, the vinyl and propenyl esters of carboxylic acids having from 2 to 20 carbon atoms whose hydrocarbon radical may be linear or branched. Among these, preference is given to the vinyl esters. Among the carboxylic acids having branched hydrocarbon radicals, preference is given to those whose branch is disposed in the α-position to the carboxyl group, and particular preference is given to the α-carbon atom being tertiary, i.e. the carboxylic acid being a neocarboxylic acid. However, preference is given to the hydrocarbon radical of the carboxylic acid being linear.

Examples of suitable alkenylcarboxylic esters are vinyl acetate, vinyl propionate, vinyl butyrate, vinyl 2-ethylhexanoate, vinyl neopentanoate, vinyl hexanoate, vinyl neononanoate, vinyl neodecanoate and the corresponding propenyl esters, although preference is given to the vinyl esters. A particularly preferred alkenylcarboxylic ester is vinyl acetate.

Particular preference is given to the ethylenically unsaturated monomer being selected from alkenylcarboxylic esters.

Also suitable are copolymers which contain two or more different copolymerized alkenylcarboxylic esters which differ in the alkenyl function and/or in the carboxylic acid group. Likewise suitable are copolymers which, in addition to the alkenylcarboxylic ester(s), contain at least one copolymerized olefin and/or at least one copolymerized (meth) acrylic ester.

The ethylenically unsaturated monomer is copolymerized in the copolymer in an amount of preferably from 1 to 50 mol %, more preferably from 10 to 50 mol % and in particular from 5 to 20 mol %, based on the overall copolymer.

The copolymer (a) preferably has a number-average molecular weight $M_n$ of from 1000 to 20 000, more preferably from 1000 to 10 000 and in particular from 1000 to 6000.

Comb polymers (b) are, for example, those described in "Comb-Like Polymers, Structure and Properties", N. A. Platé and V. P. Shibaev, J. Poly. Sci. Macromolecular Revs. 8, pages 117 to 253 (1974). Among those described there, suitable comb polymers are, for example, those of the formula II:

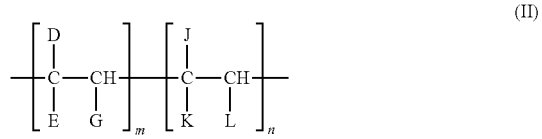

where
D is $R^{17}$, $COOR^{17}$, $OCOR^{17}$, $R^{18}$, $OCOR^{18}$ or $OR^{17}$,
E is H, $CH_3$, D or $R^{18}$,
G is H or D,
J is H, $R^{18}$, $R^{18}COOR^{17}$, aryl or heterocyclyl,
K is H, $COOR^{18}$, $OCOR^{18}$, $OR^{18}$ or COOH,
L is H, $R^{18}$, $COOR^{18}$, $OCOR^{18}$, COOH or aryl,
where
$R^{17}$ is a hydrocarbon radical having at least 10 carbon atoms, preferably having from 10 to 30 carbon atoms,
$R^{18}$ is a hydrocarbon radical having at least one carbon atom, preferably having from 1 to 30 carbon atoms,
m is a molar fraction in the range from 1.0 to 0.4 and
n is a molar fraction in the range from 0 to 0.6.

Preferred comb polymers are, for example, obtainable by copolymerization of maleic anhydride or fumaric acid with another ethylenically unsaturated monomer, for example with an α-olefin or an unsaturated ester, such as vinyl acetate, and subsequent esterification of the anhydride or acid function with an alcohol having at least 10 carbon atoms. Further preferred comb polymers are copolymers of α-olefins and esterified comonomers, for example esterified copolymers of styrene and maleic anhydride or esterified copolymers of styrene and fumaric acid. Also suitable are mixtures of comb polymers. Comb polymers may also be polyfumarates or polymaleates. Homo- and copolymers of vinyl ethers are also suitable comb polymers.

Suitable polyoxyalkylenes (c) are, for example, polyoxyalkylene esters, ethers, ester/ethers and mixtures thereof. The polyoxyalkylene compounds preferably contain at least one, more preferably at least two, linear alkyl groups(s) having from 10 to 30 carbon atoms and a polyoxyalkylene group having a molecular weight of up to 5000. The alkyl group of the polyoxyalkylene radical preferably contains from 1 to 4 carbon atoms. Such polyoxyalkylene compounds are described, for example, in EP-A-0 061 895 and also in U.S. Pat. No. 4,491,455, which are fully incorporated herein by way of reference. Preferred polyoxyalkylene esters, ethers and ester/ethers have the general formula III:

where
$R^{19}$ and $R^{20}$ are each independently $R^{21}$, $R^{21}$—CO—, $R^{21}$—O—CO(CH_2)_z— or $R^{21}$—O—CO(CH_2)_z—CO—
where $R^{21}$ is linear $C_1$-$C_{30}$-alkyl,
y is a number from 1 to 4,
x is a number from 2 to 200, and
z is a number from 1 to 4.

Preferred polyoxyalkylene compounds of the formula III in which both $R^{19}$ and $R^{20}$ are $R^{21}$ are polyethylene glycols and polypropylene glycols having a number-average molecular weight of from 100 to 5000. Preferred polyoxyalkylenes of the formula III in which one of the $R^{19}$ radicals is $R^{21}$ and the other is $R^{21}$—CO— are polyoxyalkylene esters of fatty acids having from 10 to 30 carbon atoms, such as stearic acid or behenic acid. Preferred polyoxyalkylene compounds in which both $R^{19}$ and $R^{20}$ are an $R^{21}$—CO— radical are diesters of fatty acids having from 10 to 30 carbon atoms, preferably of stearic acid or behenic acid.

The polar nitrogen compounds (d) which are advantageously oil-soluble may be either ionic or nonionic and preferably have at least one, more preferably at least 2, substituent(s) of the formula >$NR^{22}$ where $R^{22}$ is a $C_8$-$C_{40}$-hydrocarbon radical. The nitrogen substituents may also be quatemized, i.e. be in cationic form. An example of such nitrogen compounds is that of ammonium salts and/or amides which are obtainable by the reaction of at least one amine substituted with at least one hydrocarbon radical with a carboxylic acid having from 1 to 4 carboxyl groups or with a suitable derivative thereof. The amines preferably contain at least one linear $C_8$-$C_{40}$-alkyl radical. Suitable primary amines are, for example, octylamine, nonylamine, decylarnine, undecylamine, dodecylamine, tetradecylamine and the higher linear homologs. Suitable secondary amines are, for example, dioctadecylamine and methylbehenylamine. Also suitable are amine mixtures, in particular amine mixtures obtainable on the industrial scale, such as fatty amines or hydrogenated tallamines, as described, for example, in Ullmann's Encyclopedia of Industrial Chemistry, 6th Edition, 2000 electronic release, "Amines, aliphatic" chapter. Acids suitable for the reaction are, for example, cyclohexane-1,2-dicarboxylic acid, cyclohexene-1,2-dicarboxylic acid, cyclopentane-1,2-dicarboxylic acid, naphthalenedicarboxylic acid, phthalic acid, isophthalic acid, terephthalic acid and succinic acids substituted with long-chain hydrocarbon radicals.

A further example of polar nitrogen compounds is that of ring systems which bear at least two substituents of the formula -A-$NR^{23}R^{24}$ where A is a linear or branched aliphatic hydrocarbon group which is optionally interrupted by one or more groups selected from O, S, $NR^{35}$ and CO, and $R^{23}$ and $R^{24}$ are each a $C_9$-$C_{40}$-hydrocarbon radical which is optionally interrupted by one or more groups selected from O, S, $NR^{35}$ and CO, and/or substituted by one or more substituents selected from OH, SH and $NR^{35}R^{36}$ where $R^{35}$ is $C_1$-$C_{40}$-alkyl which is optionally substituted by one or more moieties selected from CO, $NR^{35}$, O and S, and/or substituted by one or more radicals selected from $NR^{37}R^{38}$, $OR^{37}$, $SR^{37}$, $COR^{37}$, $COOR^{37}$, $CONR^{37}R^{38}$, aryl or heterocyclyl, where $R^{37}$ and $R^{38}$ are each independently selected from H or $C_1$-$C_4$-alkyl; and $R^{36}$ is H or $R^{35}$.

A is preferably a methylene or polymethylene group having from 2 to 20 methylene units. Examples of suitable $R^{23}$ and $R^{24}$ radicals are 2-hydroxyethyl, 3-hydroxypropyl, 4-hydroxybutyl, 2-ketopropyl, ethoxyethyl and propoxypropyl. The cyclic system may be homocyclic, heterocyclic, fused polycyclic or nonfused polycyclic systems. The ring system is preferably carbo- or heteroaromatic, in particular carboaromatic. Examples of such polycyclic ring systems are fused benzoid structures such as naphthalene, anthracene, phenanthrene and pyrene, fused nonbenzoid structures such as azulene, indene, hydrindene and fluorene, nonfused polycycles such as diphenyl, heterocycles such as quinoline, indole, dihydroindole, benzofuran, coumarin, isocoumarin, benzothiophene, carbazole, diphenylene oxide and diphenylene sulfide, nonaromatic or partially saturated ring systems such as decalin, and three-dimensional structures such as α-pinene, camphene, bornylene, norbornane, norbornene, bicyclooctane and bicyclooctene.

A further example of suitable polar nitrogen compounds is that of condensates of long-chain primary or secondary amines with carboxyl group-containing polymers.

The polar nitrogen compounds mentioned here are described in WO 00/44857 and also in the references cited therein, which are fully incorporated herein by way of reference.

Suitable polar nitrogen compounds are also described, for example, in DE-A-198 48 621 and DE-A-196 22 052 or EP-B 398 101, which are incorporated herein by way of reference.

Suitable sulfo carboxylic acids/sulfonic acids or their derivatives (e) are, for example, those of the general formula IV:

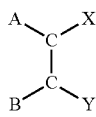
(IV)

where
Y is $SO_3^-(NR^{25}_3R^{26})^+$, $SO_3^-(NHR^{25}_2R^{26})^+$, $SO_3^-(NH_2R^{25}R^{26})$, $SO_3^-(NH_3R^{26})$ or $SO_2NR^{25}R^{26}$,
X is Y, $CONR^{25}R^{27}$, $CO_2^-(NR^{25}_3R^{27})^+$, $CO_2^-(NHR^{25}_2R^{27})^+$, $R^{28}$—$COOR^{27}$, $NR^{25}COR^{27}$, $R^{28}OR^{27}$, $R^{28}OCOR^{27}$, $R^{28}R^{27}$, $N(COR^{25})R^{27}$ or $Z^-(NR^{25}_3R^{27})$,
where
$R^{25}$ is a hydrocarbon radical,
$R^{26}$ and $R^{27}$ are each alkyl, alkoxyalkyl or polyalkoxyalkyl having at least 10 carbon atoms in the main chain,
$R^{28}$ is $C_2$-$C_5$-alkylene,
$Z^-$ is one anion equivalent and A and B are each alkyl, alkenyl or two substituted hydrocarbon radicals or, together with the carbon atoms to which they are bonded, form an aromatic or cycloaliphatic ring system.

Such sulfo carboxylic acids and sulfonic acids and their derivatives are described in EP-A-0 261 957, which is fully incorporated herein by way of reference.

Suitable poly(meth)acrylic esters (f) are either homo- or copolymers of acrylic and methacrylic esters. Preference is given to acrylic ester homopolymers which derive from $C_1$-$C_{40}$-alcohols. Preference is given to copolymers of at least two different (meth)acrylic esters which differ in the esterified alcohol. Optionally, the copolymer contains another different copolymerized olefinically unsaturated monomer. The weight-average molecular weight of the polymer is preferably from 50 000 to 500 000. A particularly preferred polymer is a copolymer of methacrylic acid and methacrylic esters of saturated $C_{14}$- and $C_{15}$-alcohols, in which the acid groups have been neutralized with hydrogenated tallamine. Suitable poly(meth)acrylic esters are described, for example, in WO 00/44857, which is fully incorporated herein by way of reference.

e) Additive Packages

The present application finally provides an additive concentrate comprising an inventive polymer as defined above and at least one diluent, and also optionally at least one further additive, in particular selected from the above coadditives.

Suitable diluents are, for example, the fractions resulting from crude oil processing, such as kerosene, naphtha or brightstock. Also suitable are aromatic and aliphatic hydrocarbons and alkoxy alkanols. Diluents used with preference in the case of middle distillates, in particular in the case of diesel fuels and heating oils, are naphtha, kerosene, diesel fuels, aromatic hydrocarbons, such as Solvent Naphtha heavy, Solvesso® or Shellsol® and also mixtures of these solvents and diluents.

The inventive copolymer is present in the concentrates preferably in an amount of from 0.1 to 80% by weight, more preferably from 1 to 70% by weight and in particular from 20 to 60% by weight, based on the total weight of the concentrate.

The invention will now be illustrated in detail with reference to the nonlimiting examples which follow.

EXAMPLES

Preparative Examples 1 to 23

A total of 23 different inventive polymers were prepared by high-pressure polymerization of ethylene, 2-ethylhexyl acrylate (EHA) and vinyl acetate (VAC).

Table 1 compares the properties of the polymers used in the test examples which follow.

The content of ethylene, EHA and VAC in the resulting polymers was determined by NMR spectroscopy. The viscosities were determined to Ubbelohde DIN 51562.

TABLE 1

| Polymer No. | E [Mol %] | VAC [Mol %] | EHA [Mol %] | Viscosity [mm²/s] | $M_n$ | $M_w$ | $M_w/M_n$ |
|---|---|---|---|---|---|---|---|
| 1 | 88.0 | 4.2 | 7.8 | 60 | 2088 | 4189 | 2.01 |
| 2 | 88.0 | 4.4 | 7.6 | 150 | 2959 | 6666 | 2.25 |
| 3 | 88.1 | 4.4 | 7.5 | 605 | 4635 | 12811 | 2.76 |
| 4 | 86.6 | 3.9 | 9.5 | 60 | 2124 | 4285 | 2.02 |

TABLE 1-continued

| Polymer No. | E [Mol %] | VAC [Mol %] | EHA [Mol %] | Viscosity [mm²/s] | $M_n$ | $M_w$ | $M_w/M_n$ |
|---|---|---|---|---|---|---|---|
| 5 | 86.4 | 4.3 | 9.3 | 150 | 3022 | 6754 | 2.23 |
| 6 | 86.4 | 4.1 | 9.5 | 595 | 4797 | 13238 | 2.76 |
| 7 | 83.8 | 4.1 | 12.1 | 60 | 2064 | 4280 | 2.07 |
| 8 | 83.2 | 4.4 | 12.4 | 150 | 2994 | 7203 | 2.41 |
| 9 | 83.1 | 4.4 | 12.5 | 600 | 4744 | 14503 | 3.06 |
| 10 | 80.2 | 4.5 | 15.3 | 150 | 3038 | 7279 | 2.40 |
| 11 | 80.4 | 4.1 | 15.5 | 600 | 4681 | 15697 | 3.35 |
| 12 | 89.6 | 8.0 | 2.4 | 60 | 1977 | 3910 | 1.98 |
| 13 | 89.8 | 7.9 | 2.3 | 150 | 2831 | 6212 | 2.19 |
| 14 | 89.2 | 8.2 | 2.6 | 605 | 3862 | 11098 | 2.87 |
| 15 | 89.8 | 8.4 | 4.8 | 60 | 1928 | 3902 | 2.02 |
| 16 | 86.5 | 8.4 | 5.1 | 150 | 2926 | 6337 | 2.17 |
| 17 | 86.3 | 8.5 | 5.2 | 620 | 4613 | 12019 | 2.61 |
| 18 | 84.2 | 8.1 | 7.7 | 60 | 2003 | 4025 | 2.01 |
| 19 | 83.1 | 8.7 | 8.2 | 150 | 2855 | 6382 | 2.24 |
| 20 | 84.3 | 8.0 | 7.7 | 615 | 4858 | 13061 | 2.69 |
| 21 | 81.1 | 7.9 | 11.0 | 60 | 2100 | 4276 | 2.04 |
| 22 | 80.8 | 8.0 | 11.2 | 150 | 2878 | 6634 | 2.31 |
| 23 | 81.1 | 7.6 | 11.3 | 630 | 4774 | 14263 | 2.99 |

E: ethylene
EHA: 2-ethylhexyl acrylate
VAC: vinyl acetate b) Test Examples 1 to 4

The polymers 1 to 23 prepared above were used to carry out the experiments which follow. For comparative purposes, the following conventional MDFIs were also tested:

Comparative product A: ethylene-vinyl acetate-based polymer mixture; polymer content 60% (Keroflux 6100, BASF AG)

Comparative product B: ethylene-vinyl acetate-based polymer; polymer content 50% (Keroflux 6103, BASF AG)

Comparative product C: ethylene terpolymer; polymer content 75%

Comparative product D: ethylene-vinyl acetate-based polymer mixture; 60% polymer content Conventional middle distillate fuels with the above inventive or conventional cold flow improvers were additized in different dosages and the lower mixing temperature, the CP value (cloud point), the PP value (pour point) and the viscosity of the additives, and also the CFPP value (cold filter plugging point) of the additized fuels were determined. The lower mixing temperature was determined to QSAA FKL 103; section 5.4.2 (ARAL Research), the CP value to ASTM D 2500, the PP value of the additives to ISO 3016, the viscosity of the additives to DIN 51512 and the CFPP value to DIN EN 116.

Test Example 1: Lower Mixing Temperature

The lower mixing temperature in the middle distillate was investigated by using 50% solutions of the polymers used in accordance with the invention in Solvent Naphtha heavy. The lower mixing temperature is of importance especially for those refineries which mix the additives unheated into fuel oils or mix additives into unheated fuel oils. When the lower mixing temperature of the additive is high, the unheated mixing may lead to filter problems.

Middle distillate used: diesel fuel, CP=−5° C., CFPP=−9° C., 25% n-paraffins, 90-20=70° C. Dosage of the Additives: 500 ppm

TABLE 2

| Additive | Lower mixing temperature [° C.] |
|---|---|
| no additive | <10 |
| Polymer No. 1 | 10 |
| Polymer No. 4 | 10 |
| Polymer No. 7 | 10 |
| Polymer No. 8 | 10 |
| Polymer No. 12 | 10 |
| Polymer No. 13 | 10 |
| Polymer No. 15 | 10 |
| Polymer No. 16 | 10 |
| Comparative product A | 20 |
| Comparative product C | 15 |
| Comparative product D | 35 |

As the above results show, the polymers used in accordance with the invention in the 50% solution exhibit a distinctly lower mixing temperature than the solution of the conventional additives.

Test Example 2: Pour Point (PP) of the Additives

The PP of the additives was determined to ISO 3016, by using 50% solutions of the polymers in Solvent Naphtha heavy. The pour point of the additives plays an important role for the handling when they are mixed into the fuel oil. A very low PP enables the convenient handling of the additives even in the case of mixing at low temperatures and saves heating costs for additive tanks.

TABLE 3

| Additive | PP [° C.] |
|---|---|
| Polymer No. 2 | 6 |
| Polymer No. 4 | 12 |
| Polymer No. 7 | −36 |
| Polymer No. 9 | −6 |
| Polymer No. 16 | −6 |
| Polymer No. 17 | 18 |
| Polymer No. 19 | −18 |
| Polymer No. 20 | 6 |
| Comparative product A | 21 |

As the above results show, the inventive additives in the 50% solution have a distinctly lower pour point than the solution of the conventional additive.

Test Example 3: Viscosity

The viscosity was determined at 50° C. to DIN 51512, by using 50% solutions of the polymers used in accordance with the invention in Solvent Naphtha. The viscosity of the additives is also important for their handling when they are mixed in at low temperatures.

TABLE 4

| Additive | $\eta$ [mm$^2$/s] |
|---|---|
| Polymer No. 2 | 40 |
| Polymer No. 7 | 18 |
| Polymer No. 12 | 27 |
| Polymer No. 13 | 52 |
| Polymer No. 16 | 40 |
| Polymer No. 19 | 35 |
| Comparative product A | 55 |

As the above results show, the additives used in accordance with the invention in the 50% solution have a distinctly lower viscosity than the solution of the conventional additive.

Test Example 4: Improvement in the Cold Flow Properties of Middle Distillates

Example a

Middle distillate used: LGO, The Netherlands, CP=1.7° C., CFPP=−1° C., 25% n-paraffins, 90−20=70° C.
Dosage of the additives: 1500 ppm

TABLE 5

| Additive | CFPP [° C.] |
|---|---|
| Polymer No. 2 | −15 |
| Polymer No. 3 | −15 |
| Polymer No. 6 | −15 |
| Polymer No. 13 | −14 |
| Polymer No. 16 | −13 |
| Polymer No. 17 | −16 |
| Comparative product A | −7 |
| Comparative product B | −10 |
| Comparative product C | −6 |
| Comparative product D | −10 |

Example b

Middle distillate used: diesel, Belgium, CP=−17° C., CFPP=−19° C., 19% n-paraffins, 90−20=89° C.
Dosage of the additives: 300 ppm

TABLE 6

| Additive | CFPP [° C.] |
|---|---|
| Polymer No. 5 | −25 |
| Polymer No. 16 | −25 |
| Comparative product A | −23 |
| Comparative product B | −23 |
| Comparative product C | −24 |
| Comparative product D | −23 |

Example c

Middle distillate used: diesel fuel, Japan, CP=−3.6° C., CFPP=−5° C., 21% n-paraffins, 90−20=90° C.
Dosage of the additives: 1500 ppm

TABLE 7

| Additive | CFPP [° C.] |
|---|---|
| Polymer No. 6 | −14 |
| Polymer No. 16 | −16 |
| Comparative product A | −8 |
| Comparative product B | −6 |
| Comparative product C | −11 |
| Comparative product D | −14 |

Example d

Middle distillate used: diesel fuel, Germany, CP=−3.3° C., CFPP=−5° C., 18% n-paraffins, 90−20=101° C.
Dosage of the additives: 150 ppm

TABLE 8

| Additive | CFPP [° C.] |
|---|---|
| Polymer No. 3 | −20 |
| Polymer No. 12 | −20 |
| Polymer No. 13 | −20 |
| Polymer No. 14 | −21 |
| Polymer No. 17 | −20 |
| Comparative product A | −16 |
| Comparative product B | −18 |
| Comparative product C | −18 |
| Comparative product D | −18 |

Example e

Middle distillate used: LHO, Belgium, CP=0° C., CFPP=−1° C., 18% n-paraffins, 90−20=125° C.
Dosage of the additives: 350 ppm

TABLE 9

| Additive | CFPP [° C.] |
|---|---|
| Polymer No. 2 | −19 |
| Polymer No. 3 | −19 |
| Polymer No. 6 | −19 |
| Polymer No. 16 | −16 |
| Polymer No. 17 | −17 |
| Polymer No. 20 | −18 |
| Comparative product A | −13 |
| Comparative product B | −13 |
| Comparative product C | −15 |
| Comparative product D | −13 |

Example f

Middle distillate used: diesel, The Netherlands, CP=−5° C., CFPP=−9° C.
Dosage of the additives: 400 ppm

TABLE 10

| Additive | CFPP [° C.] |
|---|---|
| Polymer No. 16 | −21 |
| Polymer No. 20 | −21 |

TABLE 10-continued

| Additive | CFPP [° C.] |
|---|---|
| Comparative product A | −18 |
| Comparative product B | −18 |
| Comparative product C | −19 |
| Comparative product D | −19 |

Example g

Middle distillate used: diesel, Poland, CP=−12° C., CFPP=−13° C., 12% n-paraffins, 90−20=73° C.
Dosage of the additives: 600 ppm

TABLE 11

| Additive | CFPP [° C.] |
|---|---|
| Polymer No. 2 | −23 |
| Polymer No. 15 | −22 |
| Polymer No. 16 | −24 |
| Comparative product A | −18 |
| Comparative product B | −17 |
| Comparative product C | −21 |
| Comparative product D | −20 |

The test results compiled in Tables 5 to 11 demonstrate a surprisingly good performance of the polymers used in accordance with the invention as cold flow improvers in middle distillate fuel compositions. The inventive additives thus make it possible firstly to set CFPP values comparable to those with conventional MDFIs, but at lower dosage, or improved CFPP values at the same dosage.

As test examples 1 to 3 show, the polymers used in accordance with the invention also enable better and more convenient handling, since they can be mixed in at low temperatures and also have a lower viscosity and a lower pour point than conventional additives, so that they do not have to be warmed up, or have to be warmed up to a lesser extent, before they are mixed into the fuel oil.

What is claimed is:

1. A polymer, comprising, in copolymerized form, monomers M1, M2, and M3,
wherein
M1=ethylene
M2=2-ethylhexyl acrylate
M3=vinyl acetate
the proportion by weight of the monomers is:
2-ethylhexyl acrylate: from 4% to 80% by weight,
vinyl acetate: from 1% to 42% by weight, and
wherein a viscosity of the polymer is from 10 to 1000 mm$^2$/s at a temperature of 120° C. as determined according to DIN 51562.

2. The polymer according to claim 1, wherein the proportion of weight of 2-ethylhexyl acrylate is from 5 to 62% by weight.

3. The polymer according to claim 1, wherein the proportion of weight of 2-ethylhexyl acrylate is from 7 to 45% by weight.

4. The polymer according to claim 1, wherein the number-average molecular weight Mn is from 1000 to 20000.

5. The polymer according to claim 1, wherein the number-average molecular weight Mn is from 1000 to 10000.

6. The polymer according to claim 1, wherein the weight-average molecular weight Mw is from 1000 to 30000.

7. The polymer according to claim 1, wherein the weight-average molecular weight Mw is from 2000 to 20000.

8. The polymer according to claim 1, wherein the Mw/Mn ratio is from 1.5 to 5.0.

* * * * *

UNITED STATES PATENT AND TRADEMARK OFFICE
CERTIFICATE OF CORRECTION

PATENT NO. : 10,526,558 B2
APPLICATION NO. : 16/046034
DATED : January 7, 2020
INVENTOR(S) : Wolfgang Ahlers et al.

It is certified that error appears in the above-identified patent and that said Letters Patent is hereby corrected as shown below:

In the Specification

In Column 1, Line 60, delete "(cf," and insert -- (cf., --.

In Column 4, Line 66, delete "valerie" and insert -- valeric --.

In Column 8, Line 52, delete "2-ethyihexanol," and insert -- 2-ethylhexanol, --.

In Column 10, Line 35, delete "quatemized," and insert -- quaternized, --,
    Lines 42-43, delete "decylarnine," and insert -- decylamine, --.

In Column 11, Line 12 (approx.), delete "carboaromatic." and insert -- carbonaromatic. --,
    Line 22 (approx.), delete "norbomane," and insert -- norbornane, --.

In the Claims

In Column 18, Line 26 (approx.), in Claim 4, delete "Mn" and insert -- $M_n$ --.

In Column 18, Line 28 (approx.), in Claim 5, delete "Mn" and insert -- $M_n$ --.

In Column 18, Line 30 (approx.), in Claim 6, delete "Mn" and insert -- $M_n$ --.

In Column 18, Line 32 (approx.), in Claim 7, delete "Mw" and insert -- $M_w$ --.

In Column 18, Line 33 (approx.), in Claim 8, delete "Mw/Mn" and insert -- $M_w/M_n$ --.

Signed and Sealed this
Second Day of June, 2020

Andrei Iancu
*Director of the United States Patent and Trademark Office*